(12) United States Patent
Prescott et al.

(10) Patent No.: US 10,116,384 B2
(45) Date of Patent: Oct. 30, 2018

(54) REMOTE PROGRAMMING AND TROUBLESHOOTING OF PLUGGABLE OPTICAL TRANSCEIVERS

(71) Applicant: Integra Optics, Inc., Latham, NY (US)

(72) Inventors: David Joseph Prescott, Glenmont, NY (US); Scott Thomas Owens, East Greenbush, NY (US)

(73) Assignee: Integra Optics, Inc., Latham, NY (US)

( * ) Notice: Subject to any disclaimer, the term of this patent is extended or adjusted under 35 U.S.C. 154(b) by 4 days.

(21) Appl. No.: 15/367,480

(22) Filed: Dec. 2, 2016

(65) Prior Publication Data

US 2018/0159620 A1    Jun. 7, 2018

(51) Int. Cl.
| | | |
|---|---|---|
| *H04J 14/00* | (2006.01) | |
| *H04B 10/00* | (2013.01) | |
| *H04L 1/00* | (2006.01) | |
| *H04L 12/26* | (2006.01) | |
| *H04B 10/079* | (2013.01) | |
| *H04J 14/02* | (2006.01) | |
| *H04B 10/40* | (2013.01) | |

(52) U.S. Cl.
CPC ........... *H04B 10/079* (2013.01); *H04B 10/40* (2013.01); *H04J 14/0221* (2013.01)

(58) Field of Classification Search
CPC .... H04B 10/079; H04B 10/40; H04J 14/0221
USPC .......................................... 398/25, 22, 16, 9
See application file for complete search history.

(56) References Cited

U.S. PATENT DOCUMENTS

| | | | | |
|---|---|---|---|---|
| 6,668,296 B1 * | 12/2003 | Dougherty | ............ | G06F 1/1632 710/303 |
| 6,985,953 B1 * | 1/2006 | Sandhu | ............... | G06F 17/3089 709/225 |
| 7,215,891 B1 * | 5/2007 | Chiang | .................. | H04B 10/40 398/137 |
| 8,923,704 B2 * | 12/2014 | Levinson | ............... | H04B 10/27 398/135 |
| 9,319,143 B2 * | 4/2016 | El-Ahmadi | ........ | H04B 10/2569 |
| 9,391,706 B2 | 7/2016 | Lewis et al. | | |
| 2002/0136165 A1 * | 9/2002 | Ady | .................... | G06F 11/2247 370/241 |

(Continued)

OTHER PUBLICATIONS

"Fiber Transceiver Solution" [Comprehensive solutions of fiber optics, http://www.fiber-optic-transceiver-module.com/what-are-the-differences-between-sfp-sfp-xfp-qsfpqsfp-cfp-and-qsfp28.html ].*

*Primary Examiner* — Oommen Jacob
(74) *Attorney, Agent, or Firm* — Maxine L. Barasch; Keohane & D'Alessandro PLLC

(57) ABSTRACT

Techniques are presented for remote diagnostics and programming of optical pluggable modules (OPMs). A network-enabled programmer receives OPMs in one or more form factors, such as SFP, XFP, and QSFP. The network-enabled programmer retrieves configuration and diagnostic information from coupled OPMs and transmits them to a remote computing device. A technician, operating the remote computing device, can diagnose and reconfigure OPMs from a remote location. This provides an enhanced level of customer support as customers can receive immediate assistance in diagnosis of, and programming of, optical pluggable modules. The configuration can include reconfiguring an optical pluggable module for a new channel and/or platform.

17 Claims, 6 Drawing Sheets

(56) References Cited

U.S. PATENT DOCUMENTS

| | | | |
|---|---|---|---|
| 2005/0047339 A1* | 3/2005 | Dube | H04L 1/244 370/230 |
| 2006/0051049 A1* | 3/2006 | Hahin | H04B 10/40 385/147 |
| 2009/0106406 A1* | 4/2009 | Bernard | H04L 41/0856 709/223 |
| 2009/0265142 A1* | 10/2009 | Liu | H04L 41/00 702/190 |
| 2009/0304384 A1* | 12/2009 | Li | H04B 10/40 398/58 |
| 2011/0013904 A1* | 1/2011 | Khermosh | G01M 11/3118 398/16 |
| 2011/0026525 A1* | 2/2011 | He | H04L 49/351 370/392 |
| 2012/0169272 A1* | 7/2012 | Khalepari | H01R 13/6675 320/107 |
| 2013/0208920 A1* | 8/2013 | Huang | H03G 1/00 381/107 |
| 2013/0237085 A1* | 9/2013 | Kim | H01R 13/7031 439/357 |
| 2014/0159743 A1* | 6/2014 | Dayal | G01F 23/284 324/649 |
| 2014/0321855 A1* | 10/2014 | Nors | H04Q 11/0067 398/66 |
| 2015/0200728 A1* | 7/2015 | Park | H04B 10/40 398/16 |
| 2015/0200837 A1* | 7/2015 | McCallen | H04L 43/50 370/242 |
| 2016/0335072 A1* | 11/2016 | Choo | H04B 10/40 |
| 2017/0196123 A1* | 7/2017 | Kelty | H04Q 1/035 |
| 2017/0222916 A1* | 8/2017 | Surender | H04L 45/123 |
| 2017/0310397 A1* | 10/2017 | Robitaille | H04B 10/40 |
| 2017/0331548 A1* | 11/2017 | Kim | H04L 1/0057 |

* cited by examiner

REMOTE PROGRAMMING AND TROUBLESHOOTING OF PLUGGABLE OPTICAL TRANSCEIVERS

FIELD OF THE INVENTION

The present invention relates generally to optical transceivers, and more particularly, to remote programming and troubleshooting of pluggable optical transceivers.

BACKGROUND

Electronic communication is a key component of modern life. Data for industries such as banking, commerce, telecommunications, and entertainment, to name a few, relies heavily on rapid and efficient exchange of data. Optical data transmission is prevalent in such networks to quickly and efficiently transfer large amounts of data between various nodes in the network.

Optical fibers are comprised of thin strands of specialized glass about the diameter of a human hair. They can be used to transmit signals over long distances. Fiber optic data transmission systems send information over fiber by turning electronic signals into light.

Wavelength division multiplexing (WDM) is a technique that combines multiple signals at different wavelengths for transmission along an optical fiber. These systems are prevalent for access networks, and are in wide use by content distribution networks and telecommunications networks.

At termination points, a pluggable optical transceiver may be configured to send and receive optical signals. The pluggable transceiver is a compact, hot-swappable, input/output transceiver used in data communication and telecommunications networks. There are a variety of form factors for such transceivers, including SFP (Small form factor pluggable), QSFP (Quad Small form factor pluggable), and XFP. These modules can be configured to perform conversions between optical and electrical signals. Thus, these modules are an essential component of many communication networks. It is therefore desirable to have improvements in programming and troubleshooting of pluggable optical transceivers.

SUMMARY

In one embodiment, there is provided a method for remotely programming an optical pluggable module (OPM), comprising: connecting to a network-enabled programmer from a remote computing device, wherein the network-enabled programmer has an OPM coupled to the network-enabled programmer; retrieving, by a remote computing device, an OPM configuration from the OPM that is coupled to the network-enabled programmer; and performing a remote diagnostics process on the OPM.

In another embodiment, there is provided a system for remotely programming an optical pluggable module (OPM), comprising a network-enabled programmer, wherein the network enabled programmer comprises: a processor; memory coupled to the processor; an input/output interface; a plurality of OPM interfaces configured to the input/output interface; a communications interface; wherein the memory contains instructions, that when executed by the processor, perform the steps of: establishing a communications connection between the network-enabled programmer and a remote computing device; retrieving an OPM configuration from an OPM that is coupled to the network-enabled programmer; and transmitting the OPM configuration to a remote computing device.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Techniques are presented for remote diagnostics and programming of optical pluggable modules (OPMs). A network-enabled programmer receives OPMs in one or more form factors, such as SFP, XFP, and QSFP. The network-enabled programmer retrieves configuration and diagnostic information from coupled OPMs and transmits them to a remote computing device. A technician, operating the remote computing device, can diagnose and reconfigure OPMs from a remote location. This provides an enhanced level of customer support as customers can receive immediate assistance in diagnosis of, and programming of, optical pluggable modules. The configuration can include reconfiguring an optical pluggable module for a new channel and/or platform. This reduces the number of spare modules that are required to maintain a communications network, since a spare optical pluggable module can be easily reprogrammed to replace multiple varieties of failed OPMs.

Figure 1:
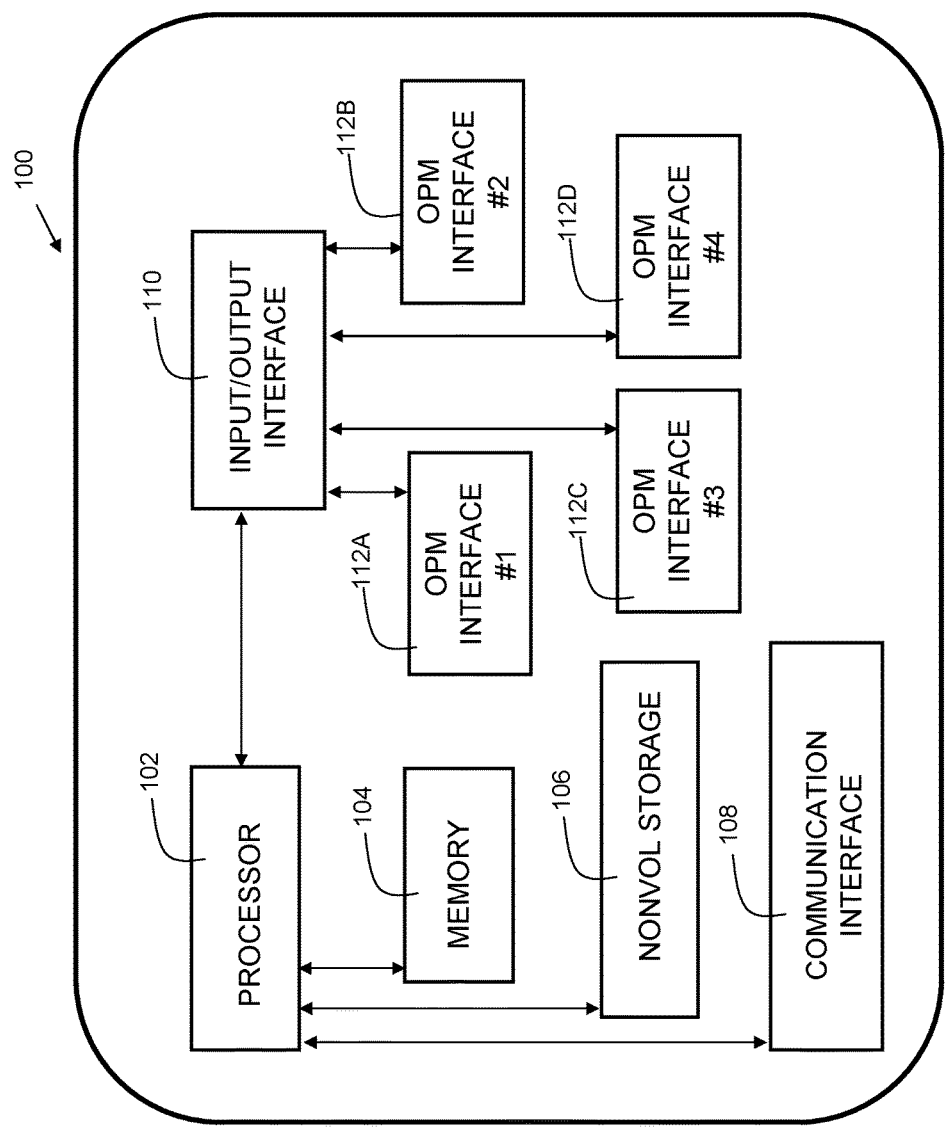
FIG. 1 is a block diagram of a network-enabled programmer in accordance with embodiments of the present invention.

FIG. 1 is a modular diagram of a network-enabled programmer in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may be a non-transitory memory. Memory 104 includes instructions, which when executed by processor(s) 102, execute steps of embodiments of the invention.

Device 100 further includes non-volatile storage 106. In embodiments, storage 106 may include a programmable read only memory, a flash memory, and/or a solid state drive (SSD). Optionally, magnetic and/or optical storage devices such as hard disk drives and/or DVD drives may be included as part of the non-volatile storage 106.

Device 100 includes a communication interface 108. In embodiments, the communication interface 108 includes a USB interface, allowing the device 100 to interface with a host computer. In some embodiments, the device 100 may receive its operating power from the USB interface, eliminating the need for a separate power supply. Thus, in embodiments, the communications interface includes a USB interface, and the network-enabled programmer is configured to receive operating power from the USB interface. In some embodiments, the communication interface may further include a wireless communication interface such as a WiFi (802.11) interface, a Bluetooth™ interface, and/or a cellular network interface. When equipped with a wireless communication interface that enables Internet access, the device may be usable in a standalone mode, without a corresponding host computer. In alternative embodiments, network 112 may include a wide area network (WAN), local area network (LAN), cloud network, cellular network, Wi-Fi network, Bluetooth network, and/or another suitable network.

Device 100 includes an input/output interface 110 which enables reading and writing of signals by processor 102. Multiple OPM interfaces (112A-112D) are coupled to the input/output interface 110. The OPM interface may include a physical port such that an OPM can be plugged into the device 100. In embodiments, the OPM interfaces may include, but are not limited to, SFP/SFP+, XFP and QSFP+/QSFP28 form factors. In embodiments, multiple physical connectors may be present on device 100. While four OPM interfaces are shown in FIG. 1, in practice, more or fewer OPM interfaces may be present.

Figure 2A:
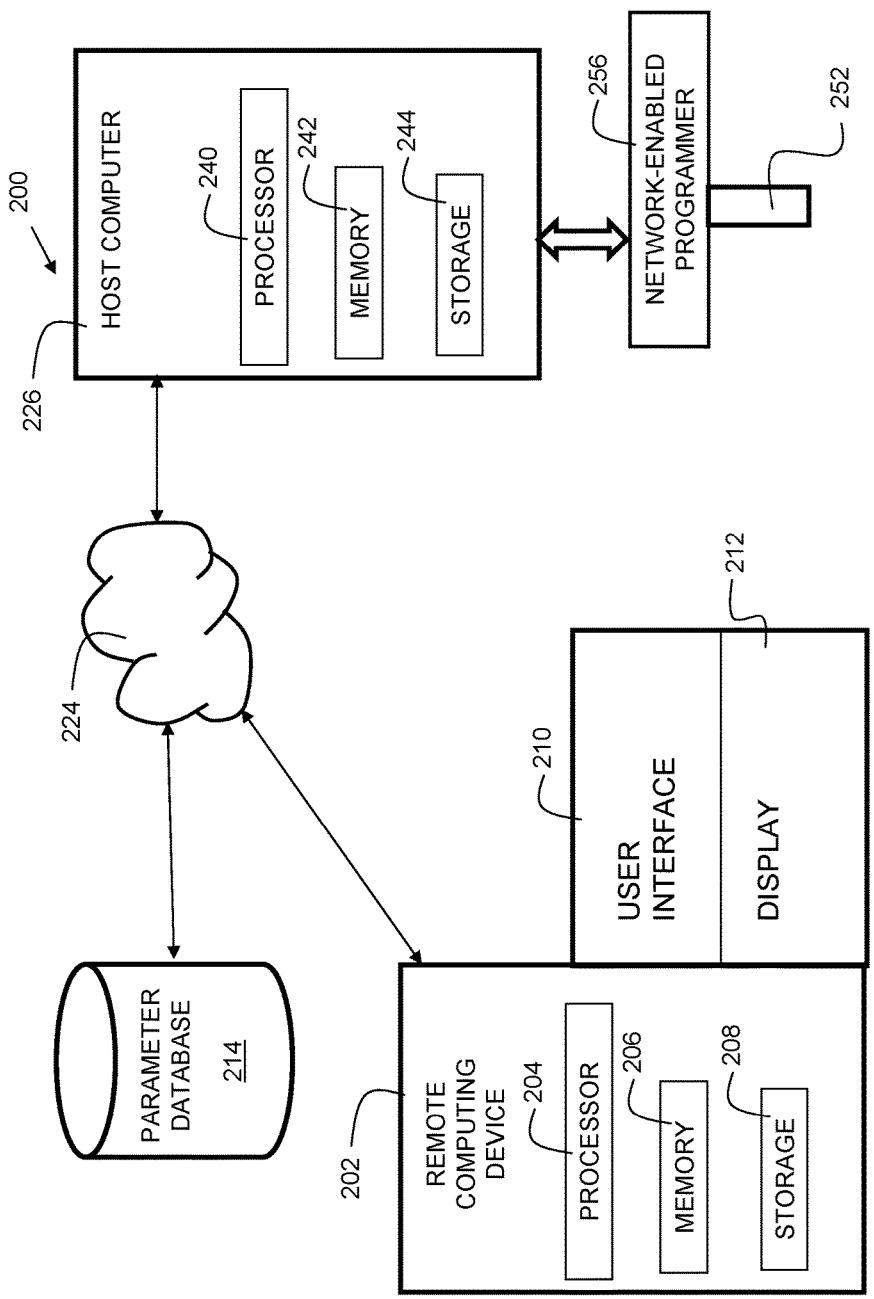
FIG. 2A is a modular diagram of a system in accordance with embodiments of the present invention.

FIG. 2A is a block diagram of a system 200 in accordance with embodiments of the present invention. System 200 includes a network-enabled programmer 256, which is similar to device 100 described previously. An optical pluggable module (OPM) 252 is inserted into a corresponding physical port on device 100. In embodiments, the OPM 252 may have an SPF form factor, an SPF+ form factor, an XFP form factor, a QSFP form factor, and/or a QSFP28 form factor. Other form factors are possible.

In this embodiment, the network-enabled programmer 256 is coupled to a host computer 226. The host computer comprises processor 240, memory 242, and storage 244. The storage 244 may include one or more hard disk drives, solid state drives, or the like. The memory 242 contains instructions, that when executed by the processor, may perform one or more steps in accordance with some embodiments of the present invention. The host computer 226 is connected to network 224. In embodiments, network 224 may include the Internet.

A remote computing device 202 is connected to network 224, enabling communication with host computer 226. The remote computing device comprises processor 204, memory 206, and storage 208. The storage 208 may include one or more hard disk drives, solid state drives, or the like. The memory 206 contains instructions, that when executed by the processor, may perform one or more steps in accordance with some embodiments of the present invention. The remote computing device 202 may further include a user interface 210 and a display 212. In embodiments, the user interface and display may be integrated into the remote computing device. For example, the remote computing device 202 may be embodied as a laptop computer, tablet computer or the like. In other embodiments, the remote computing device 202 may be implemented as a desktop computer. The display 212 may include a liquid crystal display (LCD), a plasma display, a cathode ray tube (CRT) display, a light emitting diode (LED) display, an organic LED (OLED) display, or other suitable display technology. The user interface 210 may further include a keyboard, mouse, or other suitable human interface device. In some embodiments, user interface 210 may be a touch screen, incorporating a capacitive or resistive touch screen in some embodiments.

In embodiments, the host computer 226 may be a customer computer, and the remote computing device 202 may be a technician computer. Thus in embodiments, the technician, via remote computing device 202, can initiate a remote diagnostic process by establishing a connection with the host computer 226. In other embodiments, the customer, via host computer 226, can initiate a remote diagnostic process by establishing a connection with the remote computing device 202.

In embodiments, a parameter database 214 may store programming parameters for multiple optical pluggable modules. The programming parameters may include multiple operational parameters such as voltages, currents, wavelengths, and/or channel numbers. In embodiments, the remote computing device 202 can retrieve data from the parameter database 214 and use that data to program the OPM 252 via the network-enabled programmer 256.

Figure 2B:
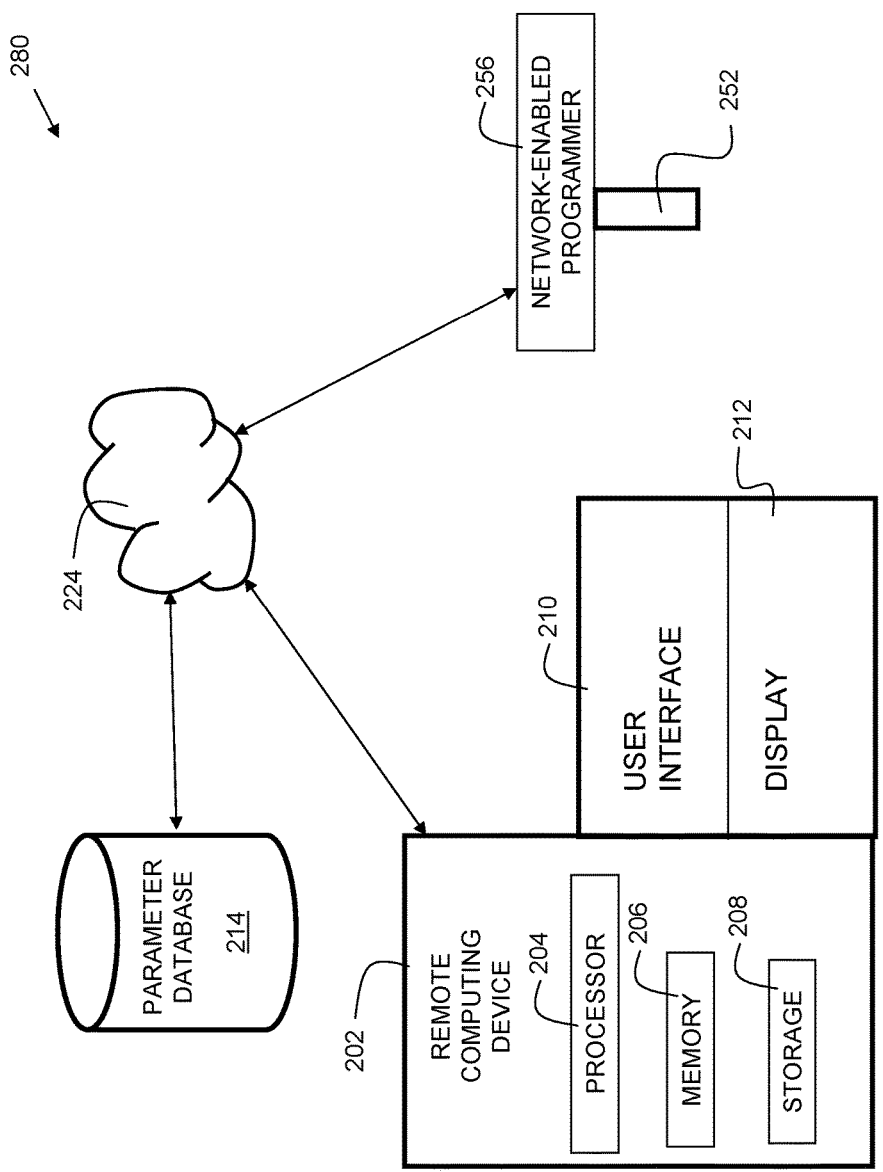
FIG. 2B is a block diagram of a system in accordance with alternative embodiments of the present invention.

FIG. 2B is a block diagram of a system 280 in accordance with alternative embodiments of the present invention. In this embodiment, the network-enabled programmer 256 is configured to communicate with the network 224 directly without the need of a host computer (see FIG. 2A). The network-enabled programmer 256 may be equipped with an internal WiFi interface. In some embodiments, the network-enabled programmer may support IPv6, enabling addresses that do not require network address translation.

Figure 3:
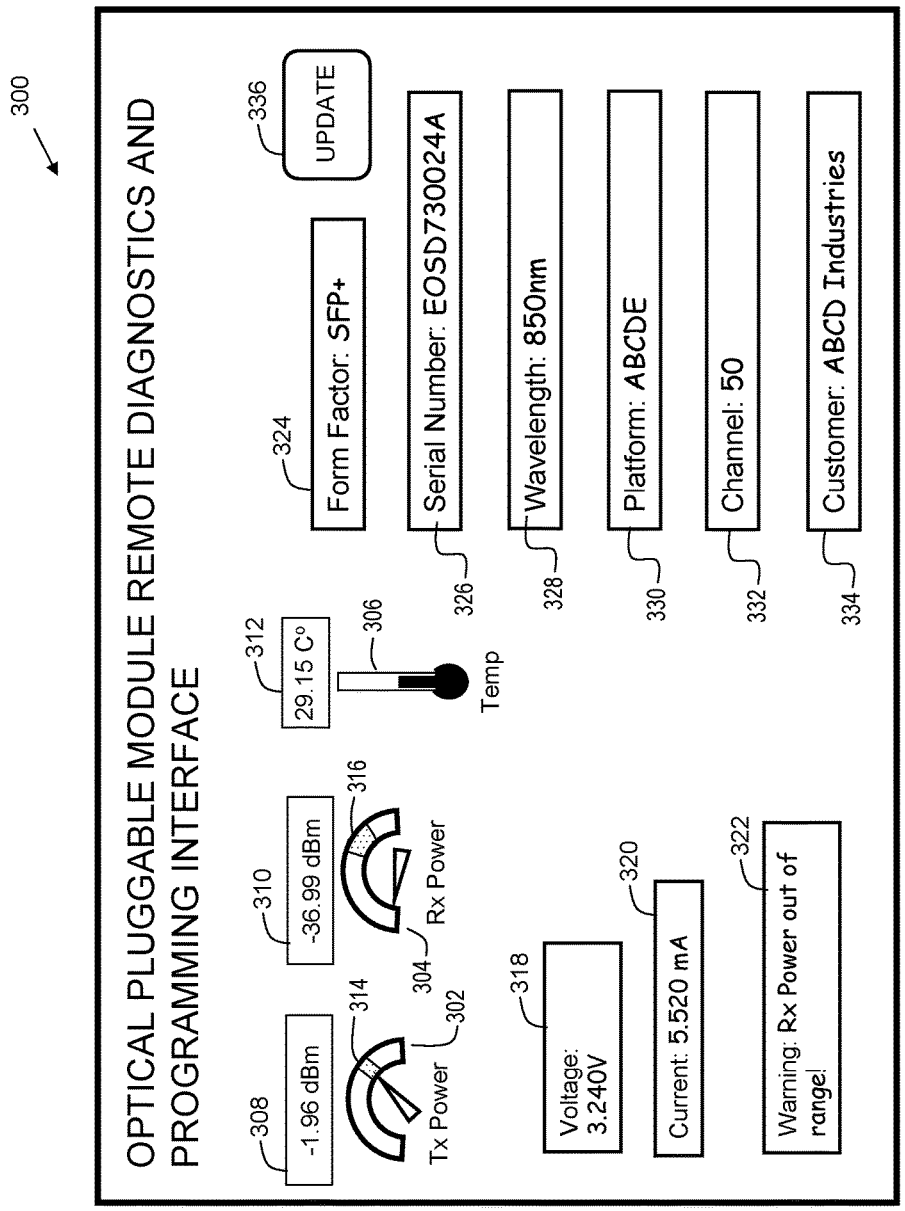
FIG. 3 is an exemplary user interface in accordance with embodiments of the present invention.

FIG. 3 is an exemplary user interface 300 in accordance with embodiments of the present invention. User interface 300 represents information that may be viewed by a technician as part of a remote diagnostic process on an optical pluggable module (OPM). Referring again to FIG. 2B, the technician can be operating remote computing device 202, while a customer has placed an optical pluggable module (OPM) in the network-enabled programmer 256 so that diagnostics and/or programming of the OPM can be performed by the technician.

Upon initiating a diagnostic session, an OPM configuration and/or performance data from the OPM 252 is read from the OPM 252 by the network-enabled programmer 256 and then sent to the remote computing device 202 via network 224. In embodiments, TCP/IP protocol is used to transmit the data between network-enabled programmer 256 and the remote computing device 202. The data may be sent as a file upload.

The diagnostic data shown in user interface 300 may include a transmit power indication 302. Thus, in embodiments, performing the remote diagnostics process comprises retrieving an average transmit power from the OPM. In embodiments, the transmit power indication may include a preferred operating range indication 314. The diagnostic data may further include a numeric display of the transmit power 308. Embodiments may also include display/reporting of an average transmit power and/or a maximum transmit power.

The diagnostic data shown in user interface 300 may include a receiver power indication 304. In embodiments, the receiver power indication may include a preferred operating range indication 316. The diagnostic data may further include a numeric display of the receiver power 310. Thus, in embodiments, performing the remote diagnostics process comprises retrieving an average receiver power from the OPM. Embodiments may include display/reporting of an average receiver power and/or a maximum receiver power.

The diagnostic data shown in user interface 300 may include a temperature indication 306. In embodiments, the diagnostic data may further include a numeric display of the temperature 312. Embodiments may include display/reporting of an average operating temperature and/or a maximum operating temperature. Thus, in embodiments, performing the remote diagnostics process comprises retrieving an average operating temperature from the OPM.

The diagnostic data shown in user interface 300 may include a voltage indication 318. Embodiments may include display/reporting of an average operating voltage and/or a maximum operating voltage. Thus, in embodiments, performing the remote diagnostics process comprises retrieving an average operating voltage from the OPM.

The diagnostic data shown in user interface 300 may include a current indication 320. Embodiments may include display/reporting of an average operating current and/or a maximum operating current. Thus, in embodiments, performing the remote diagnostics process comprises retrieving an average operating current from the OPM.

The diagnostic data shown in user interface 300 may include one or more warnings or errors in alert field 322. In this example, alert field 322 indicates a receiver power warning. In embodiments, more than one warning can be shown in the alert field 322.

The diagnostic data shown in user interface 300 may further include one or more programming parameters and/or metadata regarding the particular OPM that is undergoing diagnostics/programming. Field 324 indicates a form factor for the OPM. Field 326 indicates a serial number (or other hardware identifier) for the OPM. Thus, in embodiments, performing the remote diagnostics process comprises retrieving a device serial number from the OPM.

Field 328 indicates an operating wavelength. Field 330 indicates a platform type. Platforms can include an overall type such as Cisco, Juniper, or other platform type represented by ABODE in the figure in field 330. Thus, in embodiments, programming the configuration includes selecting an OPM platform. Field 332 indicates a particular channel for WDM operation. For example, in DWDM (Dense Wavelength Division Multiplexing), there is a channel spacing utilizing wavelengths between approximately 1525-1565 nm (C band), and/or 1570-1610 nm (L band). This small channel spacing provides the capability to simultaneously transmit more information. Thus, in embodiments, programming the configuration includes selecting an optical channel.

Field 334 indicates a customer name. A technician may edit one or more of the programming parameters and/or metadata. The technician may then press the update button 336 to send the new configuration to the network-enabled programmer 256 so that the configuration can be programmed into the coupled OPM 252.

In some embodiments, more, fewer, or different features (diagnostic data, or fields, etc.) may be included on a user interface in accordance with embodiments of the invention.

In some embodiments, the user interface 300 can be implemented using HTML pages, Java, JavaScript, or other suitable technique. In some embodiments, a browser-based user interface is used. In some embodiments, the technician may be able to remotely access the network-enabled programmer 256 via telnet, SSH, or other suitable protocol. In some embodiments, an HTTP server may be implemented on the host computer 226 and/or network-enabled programmer 256 to enable a browser-based user interface that is rendered on the remote computing device 202. Some embodiments may further include an online chat interface (not shown) so that the customer and technician can communicate via text messaging during the diagnostics/programming session.

Figure 4:
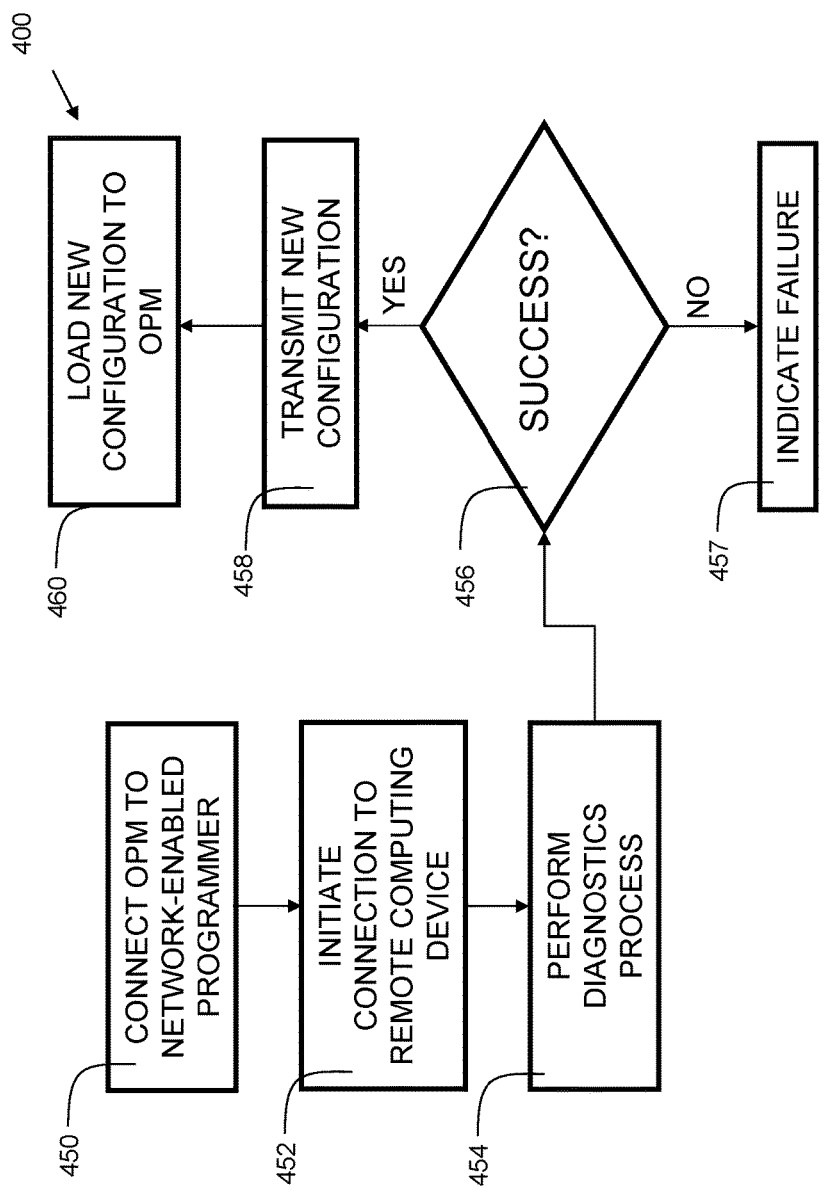
FIG. 4 is a flowchart indicating process steps for embodiments of the present invention.

FIG. 4 is a flowchart 400 indicating process steps for embodiments of the present invention. At process step 450, the OPM is connected to the network-enabled programmer. This can include plugging in a SFP, XFP, and/or QSFP OPM into a corresponding port on the network-enabled programmer. In process step 452, a connection to the remote computing device is initiated. In some embodiments, the connection is initiated by the customer. In other embodiments, the connection is initiated by the technician. In some embodiments, a preauthentication process is performed as part of the connection process. In this case, the remote computing device and network-enabled programmer are connected before a diagnostic session is requested. In this case, the connection is established in the event that diagnostics are needed, thereby allowing a quicker resolution to a problem, resulting in reduced downtime for the customer's network. In some embodiments, the preauthentication process comprises reading a hardware identifier from the OPM. In some embodiments, the hardware identifier comprises a serial number. In some embodiments, the preauthentication process comprises performing a Kerberos authentication process.

In process step 454, a diagnostics process is performed. The diagnostics process may include transmitting an indication of one or more of: average transmit power, average receiver power, average operating temperature, average operating current, average operating voltage, and/or device serial number from the OPM to the remote computing device. The diagnostics process may include transmitting a maximum transmit power, a maximum receiver power, a maximum operating temperature, a maximum operating current, a maximum operating voltage, and device serial number from the OPM to the remote computing device. The diagnostics process may further include presenting an alert message if one or more of the above parameters are outside of a predetermined range. In process step 456, the results of the diagnostics process are checked. If the diagnostics fail, the process continues to process step 457 where a failure is indicated at the remote computing device 202. If the diagnostics indicate success, then the process optionally continues to process step 458, where a new configuration may be transmitted to the network-enabled programmer. The process then proceeds to process step 460, where the new configuration is loaded into the optical pluggable module that is coupled to the network-enabled programmer.

Figure 5:
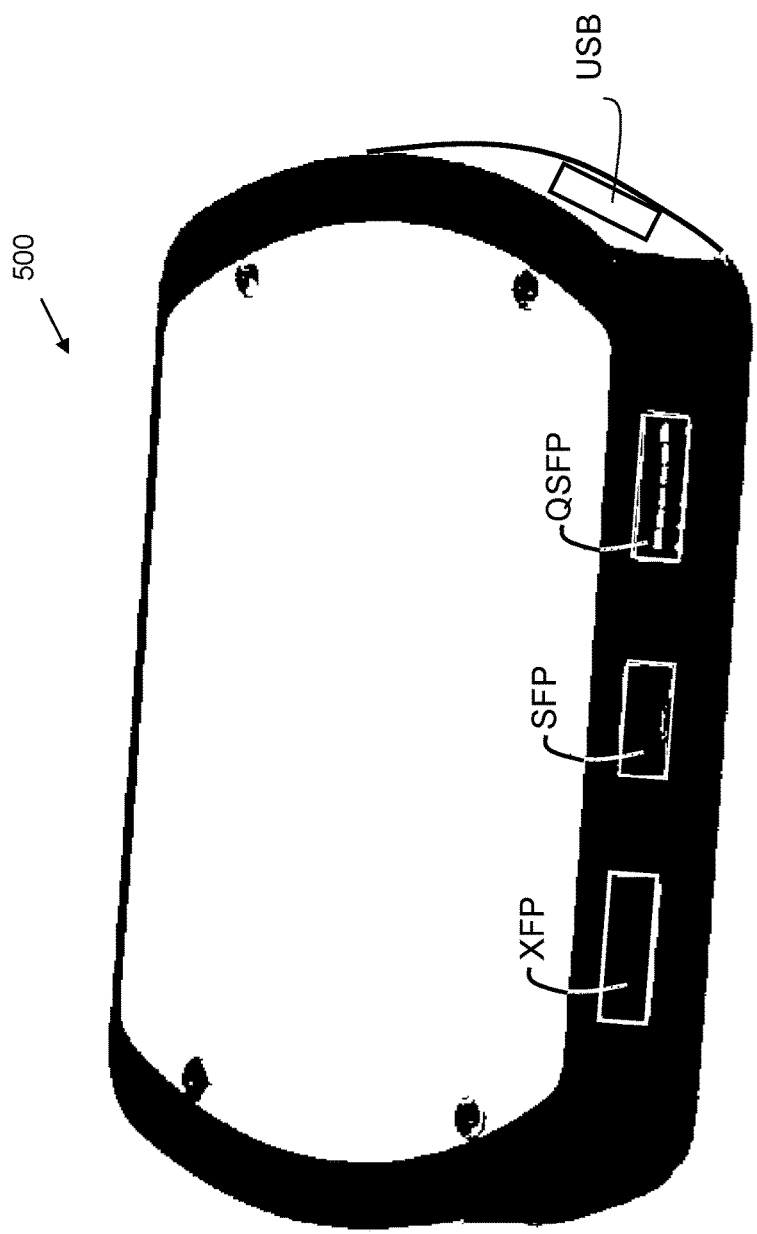
FIG. 5 shows an exterior view of an embodiment of the present invention.

FIG. 5 shows an exterior view of an example embodiment of the present invention. Network-enabled programmer 500 includes a plurality of OPM ports. As shown in FIG. 5, network-enabled programmer 500 includes an XFP port, an SFP port, and a QSFP port. While one port of each variety is shown in network-enabled programmer 500, other embodiments may have more than one port of each type. Furthermore, network-enabled programmer 500 may have ports for support of other form factors. Additionally, network-enabled programmer 500 has a USB port for interfacing to a host computer (see 226 of FIG. 2A). Further, network-enabled programmer 500 may include an Ethernet port (not shown).

As can now be appreciated, disclosed embodiments provide improvements in the programming and diagnostics of optical pluggable modules. Using the techniques of this disclosure, a technician can quickly aid one or more customers with troubleshooting and/or reprogramming of modules. This can be critical in high-reliability networks. Network engineers may have to scramble to handle an unexpected equipment failure. With embodiments of the present invention, spare OPM can be programmed to be a replacement for multiple varieties of module. Thus, downtime is reduced, increasing network bandwidth and reliability.

Although embodiments of the invention have been described herein as systems and method, in some embodiments, the invention may include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A method for remotely programming an optical pluggable module (OPM), the method performed by a computing device remote from the OPM, the method comprising:
    connecting to a network-enabled programmer, wherein the network-enabled programmer has an OPM coupled to the network-enabled programmer;
    retrieving an OPM configuration from the OPM that is coupled to the network-enabled programmer;
    performing a remote diagnostics process on the OPM;
    downloading a configuration from the remote computing device to the network-enabled programmer; and
    programming, via the network-enabled programmer, the configuration into the coupled OPM, wherein the programming the configuration includes selecting an OPM platform or selecting an optical channel.

2. The method of claim 1, wherein the remote diagnostic process is initiated by a customer.

3. The method of claim 2, wherein the remote diagnostic process includes initiating a file upload.

4. The method of claim 1, wherein the remote diagnostic process is initiated by a technician.

5. The method of claim 1, wherein connecting to the network-enabled programmer from a remote computing device comprises performing a preauthentication process.

6. The method of claim 5, wherein the preauthentication process comprises reading a hardware identifier from the OPM.

7. The method of claim 5, wherein the preauthentication process comprises performing a Kerberos authentication process.

8. The method of claim 1, wherein performing the remote diagnostics process comprises retrieving a device serial number from the OPM.

9. The method of claim 1, wherein performing the remote diagnostics process comprises retrieving an average transmit power from the OPM.

10. The method of claim 1, wherein performing the remote diagnostics process comprises retrieving an average receiver power from the OPM.

11. The method of claim 1, wherein performing the remote diagnostics process comprises retrieving an average operating temperature from the OPM.

12. The method of claim 1, wherein performing the remote diagnostics process comprises retrieving an average operating current from the OPM.

13. The method of claim 1, wherein performing the remote diagnostics process comprises retrieving an average operating voltage from the OPM.

14. A system for remotely programming an optical pluggable module (OPM), comprising a network-enabled programmer, wherein the network enabled programmer comprises:
    a processor;
    memory coupled to the processor;
    an input/output interface;
    a plurality of OPM interfaces configured to the input/output interface;
    a communications interface;
    wherein the memory contains instructions, that when executed by the processor, perform the steps of:
    establishing a communications connection between the network-enabled programmer and a remote computing device;
    retrieving an OPM configuration from an OPM that is coupled to the network-enabled programmer;
    transmitting the OPM configuration to the remote computing device;
    downloading a configuration from the remote computing device to the network-enabled programmer; and
    programming, via the network-enabled programmer, the configuration into the coupled OPM, wherein the programming the configuration includes selecting an OPM platform or selecting an optical channel.

15. The system of claim 14, wherein the plurality of OPM interfaces includes SFP, SFP+, QSPF+, QSFP28, and XFP interfaces.

16. The system of claim 14, wherein the communications interface includes a USB interface, and wherein the network-enabled programmer is configured to receive operating power from the USB interface.

17. The system of claim 14, wherein the memory further comprises instructions, that when executed by the processor, perform the steps of transmitting an indication of one or more of: average transmit power, average receiver power, average operating temperature, average operating current, average operating voltage, and device serial number from the OPM to the remote computing device.

* * * * *

UNITED STATES PATENT AND TRADEMARK OFFICE
CERTIFICATE OF CORRECTION

PATENT NO. : 10,116,384 B2
APPLICATION NO. : 15/367480
DATED : October 30, 2018
INVENTOR(S) : David Joseph Prescott et al.

Page 1 of 1

It is certified that error appears in the above-identified patent and that said Letters Patent is hereby corrected as shown below:

In the Specification

Column 5, Line 46, after "by", Delete "ABODE" and insert -- ABCDE --.

Signed and Sealed this
First Day of January, 2019

Andrei Iancu
*Director of the United States Patent and Trademark Office*